(12) United States Patent
Allen

(10) Patent No.: US 6,903,861 B1
(45) Date of Patent: Jun. 7, 2005

(54) ERECTED MIRROR OPTICAL SWITCH

(75) Inventor: James J. Allen, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 10/763,913

(22) Filed: Jan. 22, 2004

(51) Int. Cl.[7] .......................... G02B 26/00; G02B 7/182
(52) U.S. Cl. ...................... 359/291; 359/871; 359/872
(58) Field of Search ................................ 359/290, 291, 359/220, 223, 245, 322, 871, 872, 846, 847, 849; 310/309

(56) References Cited

U.S. PATENT DOCUMENTS

| | | | |
|---|---|---|---|
| 5,804,084 | A | 9/1998 | Nasby et al. |
| 5,867,302 | A | 2/1999 | Fleming |
| 5,959,376 | A | 9/1999 | Allen |
| 6,283,601 | B1 | 9/2001 | Hagelin et al. |
| 6,299,462 | B1 | 10/2001 | Biegelsen |
| 6,366,414 | B1 | 4/2002 | Aksyuk et al. |
| 6,386,716 | B2 * | 5/2002 | Hagelin et al. ............. 359/871 |
| 6,491,404 | B2 | 12/2002 | Hill |
| 6,526,198 | B1 | 2/2003 | Wu et al. |
| 6,535,318 | B1 | 3/2003 | Wood et al. |
| 6,543,087 | B2 | 4/2003 | Yeh et al. |
| 6,545,385 | B2 | 4/2003 | Miller et al. |
| 2002/0135850 | A1 | 9/2002 | Hagelin et al. |

OTHER PUBLICATIONS

K.S.J. Pister, et al "Microfabricated hinges," Sensors and Actuators A, 33 (1992) pp. 249–256.

Richard Yeh, et al "Surface–Micromachined Components for Articulated Microrobots," Journal of Microelectromechanical Systems, vol. 5, No. 1, Mar. 1996 pp. 10–17.

L.Y. Lin, et al, "Free–Space Micromachined Optical Switches for Optical Networking," IEEE Journal of Selected Topics in Quantum Electronics, vol. 5, No. 1, Jan./Feb. 1999 pp. 4–9.

Paul M. Hagelin, et al "Optical Raster–Scanning Displays Based on Surface–Micromachined Polysilicon Mirrors," IEEE Journal of Selected Topics in Quantum Electronics, vol. 5 No. 1, Jan./Feb. 1999 pp. 67–74.

Yong Seop Yoon, et al, "A Low voltage Actuated Micromirror with an Extra Vertical Electrode for 90 degree Rotation", Journal of Micromechanics and Microengineering, Aug. 14, 2003 pp. 922–926.

* cited by examiner

Primary Examiner—Hung Xuan Dang
Assistant Examiner—Tuyen Tra
(74) Attorney, Agent, or Firm—John P. Hohimer

(57) ABSTRACT

A microelectromechanical (MEM) optical switching apparatus is disclosed that is based on an erectable mirror which is formed on a rotatable stage using surface micromachining. An electrostatic actuator is also formed on the substrate to rotate the stage and mirror with a high angular precision. The mirror can be erected manually after fabrication of the device and used to redirect an incident light beam at an arbitrary angel and to maintain this state in the absence of any applied electrical power. A 1×N optical switch can be formed using a single rotatable mirror. In some embodiments of the present invention, a plurality of rotatable mirrors can be configured so that the stages and mirrors rotate in unison when driven by a single micromotor thereby forming a 2×2 optical switch which can be used to switch a pair of incident light beams, or as a building block to form a higher-order optical switch.

16 Claims, 13 Drawing Sheets

| Switch 1 | Switch 2 | Switch 3 | Output Signal Order |
|---|---|---|---|
| 0 | 0 | 0 | 123 |
| 0 | 1 | 0 | 213 |
| 0 | 0 | 1 | 132 |
| 0 | 1 | 1 | 312 |
| 1 | 0 | 0 | 213 |
| 1 | 1 | 0 | 123 |
| 1 | 0 | 1 | 231 |
| 1 | 1 | 1 | 321 |

ERECTED MIRROR OPTICAL SWITCH

GOVERNMENT RIGHTS

This invention was made with Government support under Contract No. DEAC-04-94AL85000 awarded by the U.S. Department of Energy. The Government has certain rights in the invention.

FIELD OF THE INVENTION

The present invention relates in general to microelectromechanical devices, and in particular to microelectromechanical optical switches for redirecting an incident light beam.

BACKGROUND OF THE INVENTION

Optical switches can be utilized to redirect light beams in free space or between optical fibers. Many different types of optical switches fabricated by surface micromachining have been disclosed in recent years (see e.g. U.S. Pat. Nos. 5,867,302; 6,283,601; 6,366,414; 6,526,198; 6,535,318 and 6,545,385; see also L. Y. Lin et al, "Free-Space Micromachined Optical Switches for Optical Networking," *IEEE Journal of Selected Topics in Quantum Electronics*, vol.5, pp. 4–9, 1999). The existing optical switches which are tiltable within a limited angular range generally suffer from a need to have electrical power applied at all times in order to establish and maintain an optical connection; whereas other of the existing optical switches which continue to operate when the electrical power is removed are generally limited to only a pair of well-defined angular states.

The microelectromechanical (MEM) optical switching apparatus of the present invention provides an advance over the prior art in being capable of redirecting an incident light beam over any angle within a wide angular range of up to 90° or more and can maintain a path for the redirected light beam after any applied electrical power has been removed. Furthermore, the MEM optical switching apparatus of the present invention can redirect an incident light beam to any of a plurality of optical fibers or to any of a plurality of angular directions in free space thereby forming a 1×N optical switch. The MEM optical switching apparatus of the present invention can also be formed as a 2×2 optical switch that operates using a single micromotor and with a plurality of mirrors in the 2×2 optical switch being moveable in unison.

These and other advantages of the present invention will become evident to those skilled in the art.

SUMMARY OF THE INVENTION

The present invention relates to a microelectromechanical (MEM) optical switching apparatus for redirecting an incident light beam. The MEM optical switching apparatus comprises a stage formed on a substrate (e.g. comprising silicon), with the stage being rotatable about an axis that is substantially perpendicular to a major surface of the substrate; a mirror formed on the stage in an initial position which is substantially parallel to the major surface of the substrate, with the mirror being subsequently moveable to an erected position which is oriented substantially perpendicular to the major surface of the substrate; and an electrostatic actuator operatively coupled to rotate the stage and thereby redirect the incident light beam.

The MEM optical switching apparatus can further include one or more electrically-severable fuzes for attaching the mirror, which can comprise two interconnected layers of polycrystalline silicon, to the substrate in the initial position. The fuzes can be electrically severed (i.e. blown) with an applied electrical current. A hinged frame can then be used to move the mirror to the erected position where the mirror can be locked in the erected position by a latch formed on the stage. The latch preferably further includes a spring to urge the latch into contact with the mirror to lock the mirror in the erected position.

The electrostatic actuator can move the stage over an arbitrary angle (e.g. up to 360° or more) with a high angular precision of about one degree or less. In certain embodiments of the present invention, the electrostatic actuator can be operatively coupled to rotate the stage with a reciprocating shuttle that includes a pair of teeth which engage with a plurality of opposing teeth formed on the stage proximate to an outer edge thereof.

The present invention further relates to a MEM optical switching apparatus for redirecting an incident light beam which comprises a stage formed on a substrate, with the stage being rotatable about an axis that is substantially perpendicular to a major surface of the substrate. The MEM optical switching apparatus further comprises a mirror formed on the stage in an initial position which is substantially parallel to the major surface of the substrate, with the mirror being subsequently erectable to an erected position with a light-reflecting surface of the mirror being oriented at with an angle to the major surface of the substrate, A hinged frame formed proximate to mirror can be used to move the mirror from the initial position to the erected position. An electrically-severable fuze is provided to attach one end of the mirror to the substrate during fabrication thereof, with the mirror being releasable for movement after the fuze is electrically severed by an electrical current. An electrostatic actuator is formed on the substrate and is operatively coupled to rotate the stage to redirect the light beam incident on a light-reflecting surface of the mirror.

The mirror can be locked in the erected position by a latch formed on the stage. In the erected position, the mirror can be oriented at any angle and, in particular, an angle which is substantially equal to 90° with respect to the major surface of the substrate. The electrostatic actuator, which can comprise an electrostatic comb actuator, can then be used to rotate the mirror as needed to redirect the incident light beam.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings:

FIG. 2A shows the MEM optical switching apparatus in the as-fabricated state with the mirror being substantially parallel to the plane of the substrate as shown in the schematic plan view of FIG. 1.

FIG. 2B shows the mirror being raised to the erected position and locked therein using a hinged frame which is moved in the direction indicated by the horizontal arrow.

FIG. 2C shows the hinged frame retracted to leave the mirror in the erected position and ready for movement about an axis which is substantially perpendicular to the plane of the substrate.

FIG. 8A shows a pair of incident light beams transmitted through the 2×2 optical switch unchanged.

FIG. 8B shows the incident light beams switched by rotation of the mirrors in the 2×2 optical switch.

DETAILED DESCRIPTION OF THE INVENTION

Figure 1:
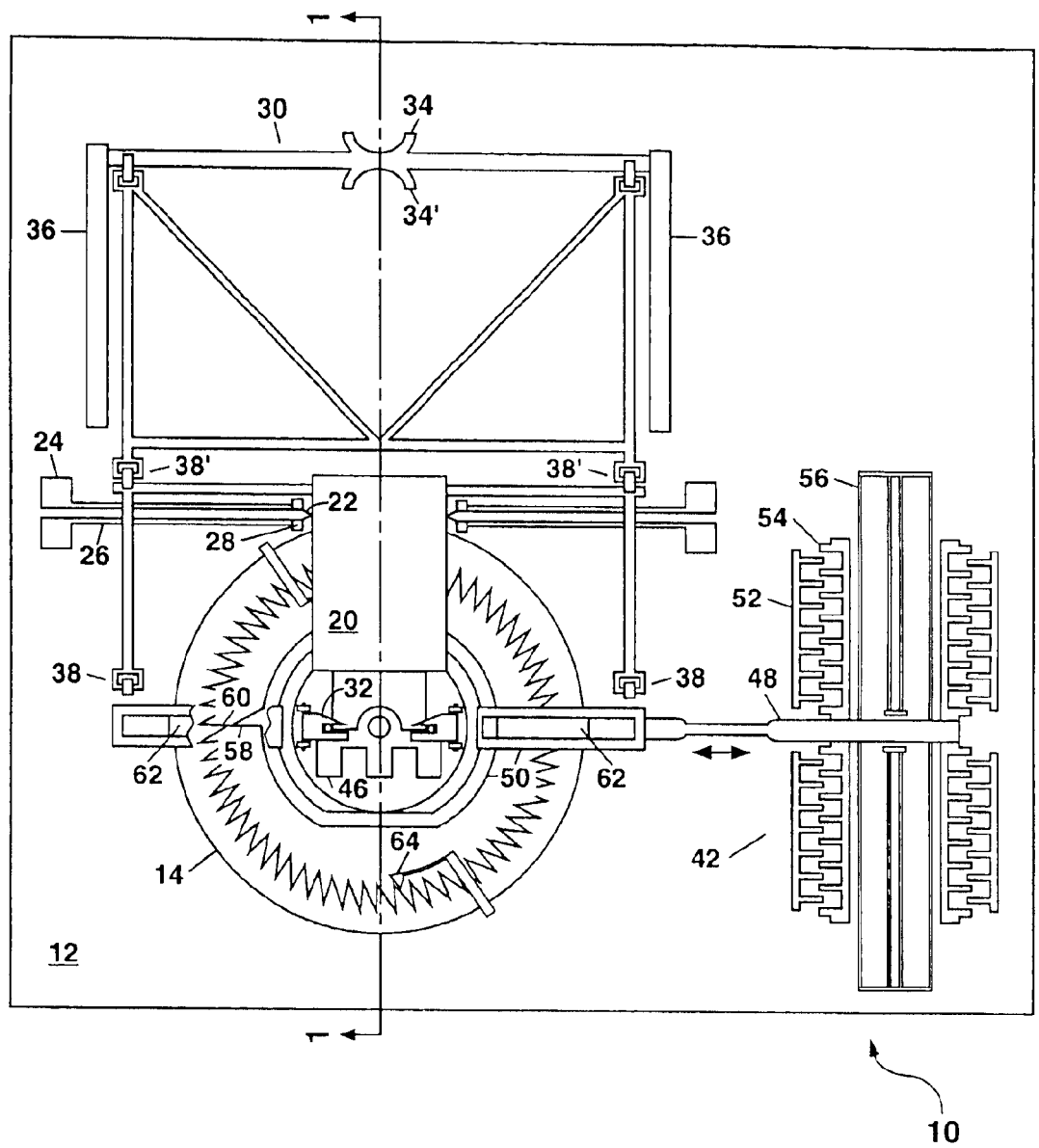
FIG. 1 shows a schematic plan view of an example of the MEM optical switching apparatus of the present invention in an as-fabricated state with the mirror in the initial position substantially parallel to the plane of the substrate.

Referring to FIG. 1, there is shown a schematic plan view of an example of the microelectromechanical (MEM) optical switching apparatus 10 of the present invention in an as-fabricated state prior to the erection of a mirror 20 therein. The MEM optical switching apparatus 10 can be formed by surface micromachining on a substrate 12 which generally comprises silicon (e.g. a monocrystalline silicon substrate, or a silicon-on-insulator substrate).

Figure 2A:
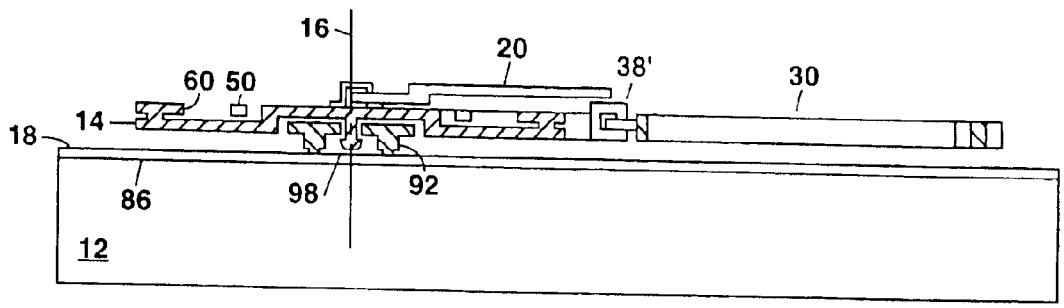
FIGS. 2A–2C show schematic cross-section views of the MEM optical switching apparatus of FIG. 1 along the section line 1—1 in FIG. 1.

The MEM optical switching apparatus 10 in FIG. 1 further comprises a stage 14 formed on the substrate 12, with the stage 14 being rotatable about an axis 16 which is substantially perpendicular to a major surface 18 of the substrate 12 as shown in FIG. 2A, with the major surface 18 defining the plane of the substrate 12 or a layer formed thereon. An erectable mirror 20 is formed on the stage 14, with the mirror 20 being fabricated in an initial position which is substantially parallel to the major surface 18 of the substrate 12 as shown in FIGS. 1 and 2A.

The mirror 20 can be secured during fabrication of the apparatus 10 by one or more fuzes 22 as shown in FIG. 1 which attach the mirror 20 to the substrate 12. The fuzes 22 can be electrically severed (i.e. blown) to detach the mirror 20 from the substrate 12 by applying an electrical current to a pair of probe or contact pads 24 electrically connected to the fuzes 22 through wiring 26 formed on the substrate 12. This evaporates portions of one or more layers of doped polycrystalline silicon (also termed polysilicon) which are used to form the fuzes 22 and which attach the mirror 20 to the substrate 12 through a pair of posts 28. The posts 28, contact pads 24 and electrical wiring 26 can be formed on the substrate 12 over an electrically-insulating layer 86, while the fuzes 22 are generally suspended above the substrate 12 between the mirror 20 and the posts 28.

Figure 2B:
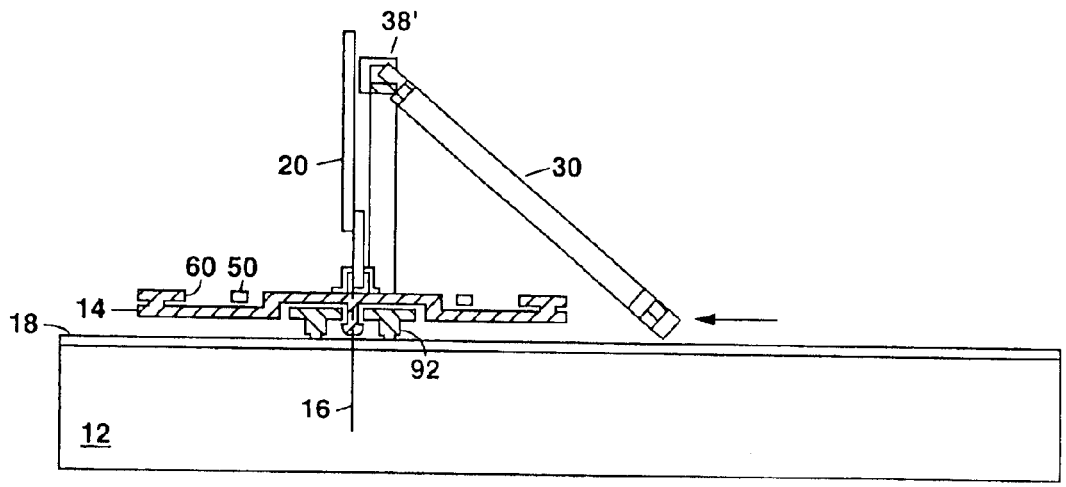
Figure 3:
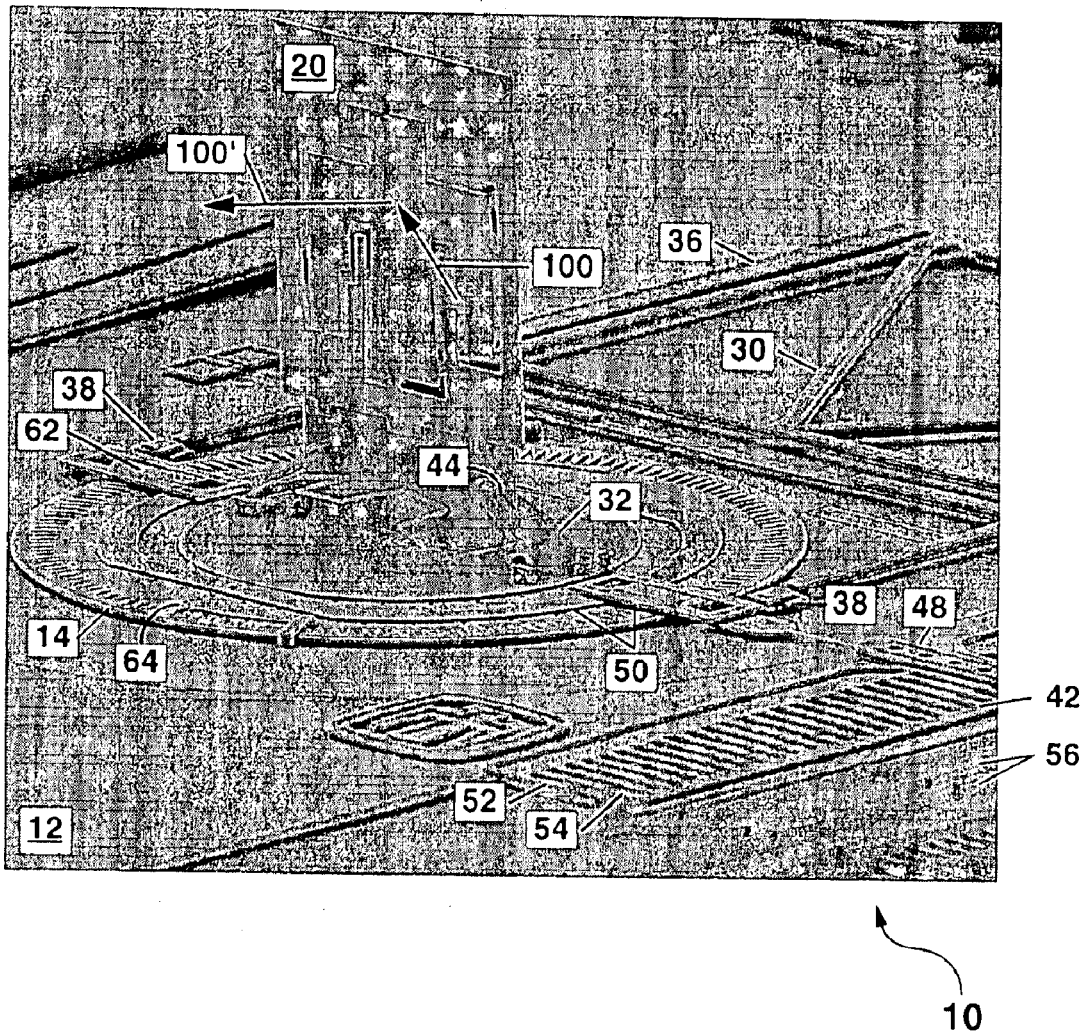
FIG. 3 shows an SEM image of the MEM optical switching apparatus of FIG. 1 with the mirror erected and locked in place.

Once the mirror 20 has been detached from the substrate 12 by electrically severing the fuzes 22, the mirror 20 can be raised to an erected position as shown in FIG. 2B and in the scanning electron microscope (SEM) image of FIG. 3, and locked in place by one or more latches 32 formed on the stage 14. FIG. 3 also shows that the mirror 20 can be optionally patterned to form an arbitrarily-shaped light-reflecting surface.

Figure 2C:
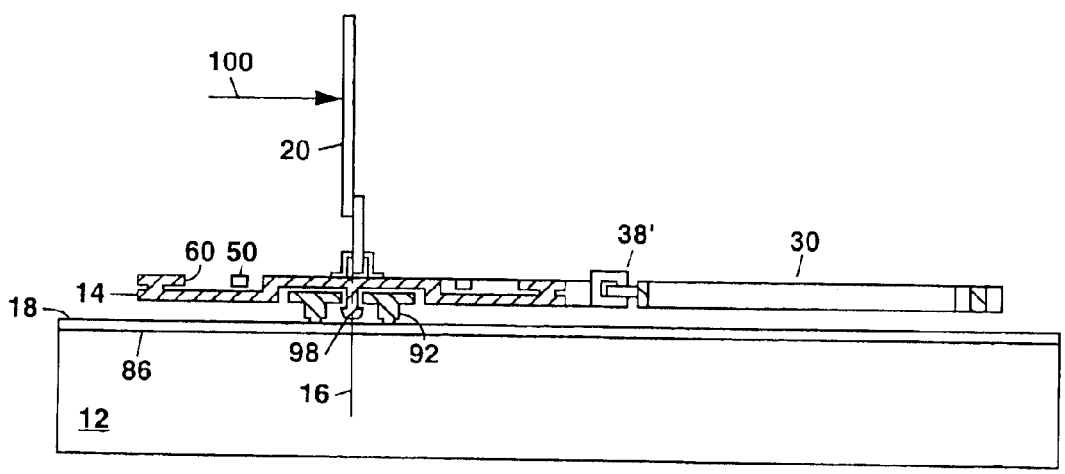

The mirror 20 in the example of FIGS. 1–3 can be erected from the as-fabricated state using a hinged frame 30. This is illustrated in the schematic cross-section views of FIGS. 2A–2C which are taken along the section line 1—1 in FIG. 1. In FIG. 2A, the mirror 20 is shown in the as-fabricated state substantially parallel to the plane of the substrate 12. In the example of the present invention in FIGS. 1–3, the mirror 20 can be erected manually after severing the fuzes 22. To assist in raising the mirror 20 off the substrate 12, one or more pre-stressed beams (not shown) can be optionally formed underneath at least a part of the mirror 20 to initially urge the mirror 20 away from the substrate 12 in preparation for raising the mirror 20. The pre-stressed beams can comprise a core layer of a sacrificial material (e.g. silicon dioxide or a silicate glass) which is encased between a pair of layers of polycrystalline silicon (e.g. a Poly-1 layer and a Poly-2 layer which will be described hereinafter) with one end of each pre-stressed beam being attached to the stage 14 and with the other end of each pre-stressed beam being unattached (i.e. free to move). A net residual stress after a final annealing step will be present in the encased sacrificial material which can cause the free end of each pre-stressed beam to curl upwards once the fuzes 22 are severed. Further details of the use of pre-stressed beams to initially uplift a mirror by a few microns can be found in U.S. Pat. No. 6,545,385 which is incorporated herein by reference.

Erecting the mirror 20 can also be done using a conventional metal probe tip in a micromanipulator (not shown) to engage a tab 34 formed in one end of the frame 30 as shown in FIGS. 1 and 2B. As that end of the frame 30 is urged towards the mirror 20 using the probe tip, the frame 30 can slide over the surface 18 of the substrate 12. Since the probed end of the frame 30 is constrained to move in the plane of the substrate 12 by a pair of guides 36, the other end of the frame 30, which is hingeably attached the substrate 12 by hinges 38 and which includes additional hinges 38', will buckle upwards as shown in FIG. 2B, and this will push the mirror 20 upward.

Each corner of the mirror 20 proximate to the axis 16 is hingeably attached to the stage 14 by a mirror hinge 40 (see FIG. 4) so that the mirror 20 can be erected in a predetermined location on the stage 14. Additionally, a pair of hinged latches 32 are provided on the stage 14 to lock the mirror 20 in the erected position at a predetermined angle (e.g. 45° or 90°) with respect to the plane of the substrate 12. The latches 32, which can be fabricated to overlie a portion of the mirror 20 as shown in FIG. 1, are automatically moved into position by the movement of the mirror 20 as the mirror 20 is slowly raised, with a cam surface on one side of each latch 32 sliding across the mirror 20 until the mirror 20 reaches a slot 44 and is captured therein to lock the mirror 20 in place. Each latch 32 can further include a stop formed integrally with one side of the slot 44 to prevent the mirror 20 from moving past the slot 44 without being captured therein. Additionally, a latch spring 46 connected between the two latches 32 helps to capture the mirror 20 in the slot 44 by urging the latches 32 against the mirror 20. The latch spring 46 also holds the latches 32 in place after the erection of the mirror 20 to lock the mirror 20 in place (see FIG. 4).

Once the mirror 20 has been erected and locked in position by the latches 32, the frame 30 can be retracted as shown in FIG. 2C by engaging the probe tip in an oppositely-oriented tab 34' and moving the tab 34' and frame 30 away from the mirror 20. Retraction of the hinged frame 30 prepares the MEM optical switching apparatus 10 for operation. In the erected position, the mirror 20 can be used to redirect an incident light beam 100 in free space, or between a plurality of optical fibers.

Rotation of the mirror 20 can be provided in the MEM apparatus 10 by an electrostatic actuator 42 (e.g. an electrostatic comb actuator) formed on the substrate 12 and operatively connected to rotate the stage 14. This can be done as shown in the example of FIGS. 1–4 by connecting a suspended moveable beam 48 in the electrostatic actuator 42 to provide a reciprocating motion to a shuttle 50.

The electrostatic actuator 42 comprises a plurality of stationary electrostatic combs 52 enmeshed with moveable electrostatic combs 54. The moveable electrostatic combs 54, which are attached to the moveable beam 48, are suspended above the substrate 12 by a plurality of folded springs 56. The application of a voltage (generally 5–100 volts) through wiring (not shown) on the substrate 12 to the stationary and moveable electrostatic combs 52 and 54 on a left-hand side of the electrostatic comb actuator 42 in FIG. 1 produces an electrostatic force of attraction that moves the combs 52 and 54 towards each other. This moves the shuttle 50 to the left. A subsequent application of the voltage between the combs 52 and 54 on a right-hand side of the electrostatic comb actuator 42 moves the shuttle 50 towards the right in FIG. 1. By alternately applying the voltage to the combs 52 and 54 on each side of the actuator 42, a reciprocating motion of the shuttle 50 can be produced.

The shuttle 50 has a pair of teeth 58 on each side thereof which engage with a plurality of opposing teeth 60 formed in the stage 14 proximate to an outer edge thereof. In FIG. 1, a cutaway view of portions of the shuttle 50 and a guide 62 therefor show how the teeth 58 can be formed on each side of the shuttle 50 oriented along the direction of reciprocating motion of the shuttle as indicated by a double-ended arrow in FIG. 1.

As the shuttle 50 is moved to the left in FIG. 1 by the electrostatic actuator 42, a sloped face of the tooth 58 shown can act as a wedge to push against the sloped face of the opposing tooth 60 on the stage 14. This urges the stage 14 to rotate incrementally in the clockwise direction for the example of the apparatus 10 in FIG. 1. The exact extent of movement of the stage 14 about the axis 16, which depends upon the displacement of the shuttle 50 and the number of teeth 60 provided in the stage 14, can be on the order of one degree or less. A further increment of rotation of the stage 14 can be provided by moving the shuttle 14 to the right so that the other tooth 58 engages an opposing tooth 60 on the stage 14. The back and forth motion of the shuttle 50 can be repeated as needed to rotate the stage 14 and mirror 20 over an arbitrary angle which can be up to 360° or more (i.e. the stage 14 can be rotated around a circle more than once to orient the mirror 20 as needed). A precise knowledge of the position of the stage 14 and mirror 20 can be determined from voltage pulses provided to the electrostatic actuator 42 for operation thereof. One or more optional anti-rotation pawls 64 can also be provided in the MEM optical switching apparatus 10 as shown in FIGS. 1 and 3 to limit rotation of the stage 14 and mirror 20 to a single direction (e.g. the clockwise direction). In other embodiments of the present invention, a bidirectional rotation of the stage 14 and mirror 20 can be provided, for example, by providing an appropriate shaping of the teeth 58 and 60 so that one tooth 58 can be used to rotate the stage 14 in one direction and the other tooth 58 can be used to rotate the stage 14 in the opposite direction.

In FIG. 3, a light beam 100 incident on a light-reflecting surface of the mirror 20 will result in a redirected light beam 100' in a direction which can be determined by the position of the stage 14 and mirror 20. In the example of FIGS. 1–4, with the mirror 20 erected to a position substantially perpendicular to the plane of the substrate 12, the incident light beam 100 will generally be in the plane of the substrate 12. In other embodiments of the present invention, with the mirror 20 oriented at an arbitrary angle with respect to the plane of the substrate 12, the incident light beam 100 can be incident on the mirror 20 at angles other than substantially in the plane of the substrate 12.

In some instances, the light beam 100 and mirror 20 can also be oriented so that the light beam 100 completely bypasses the mirror 20 in one position of the stage 14 and is intercepted and reflected by the mirror 20 in another position of the stage 14. This can allow the incident light 100 to be switched in free space or between a plurality of optical fibers 82 as will be described hereinafter (see FIG. 7). Lenses 82 can be used as needed to collimate the light beam 100, or to focus the light beam 100 onto the mirror 20 which can have lateral dimensions on the order of 20–500 microns or more.

A plurality of the MEM optical switching devices 10 of the present invention can be formed on a common substrate 12 to form an optical switch for switching one or more incident light beams 100. This can be done, for example, by providing a plurality of devices 10 as shown in FIGS. 1–4 on the common substrate 12. In other embodiments of the present invention, a MEM optical switching apparatus 10 can be formed by providing each mirror 20 on a rotatable stage 14, with the stage 14 having a plurality of gear teeth on the periphery thereof so that the stage 14 can act as a gear. This allows other types of electrostatic actuators 42 or micromotors as known to the art to be utilized to rotate the mirror 20 by utilizing one or more gears that mesh with the gear teeth on the periphery of the stage 14.

Figure 5:
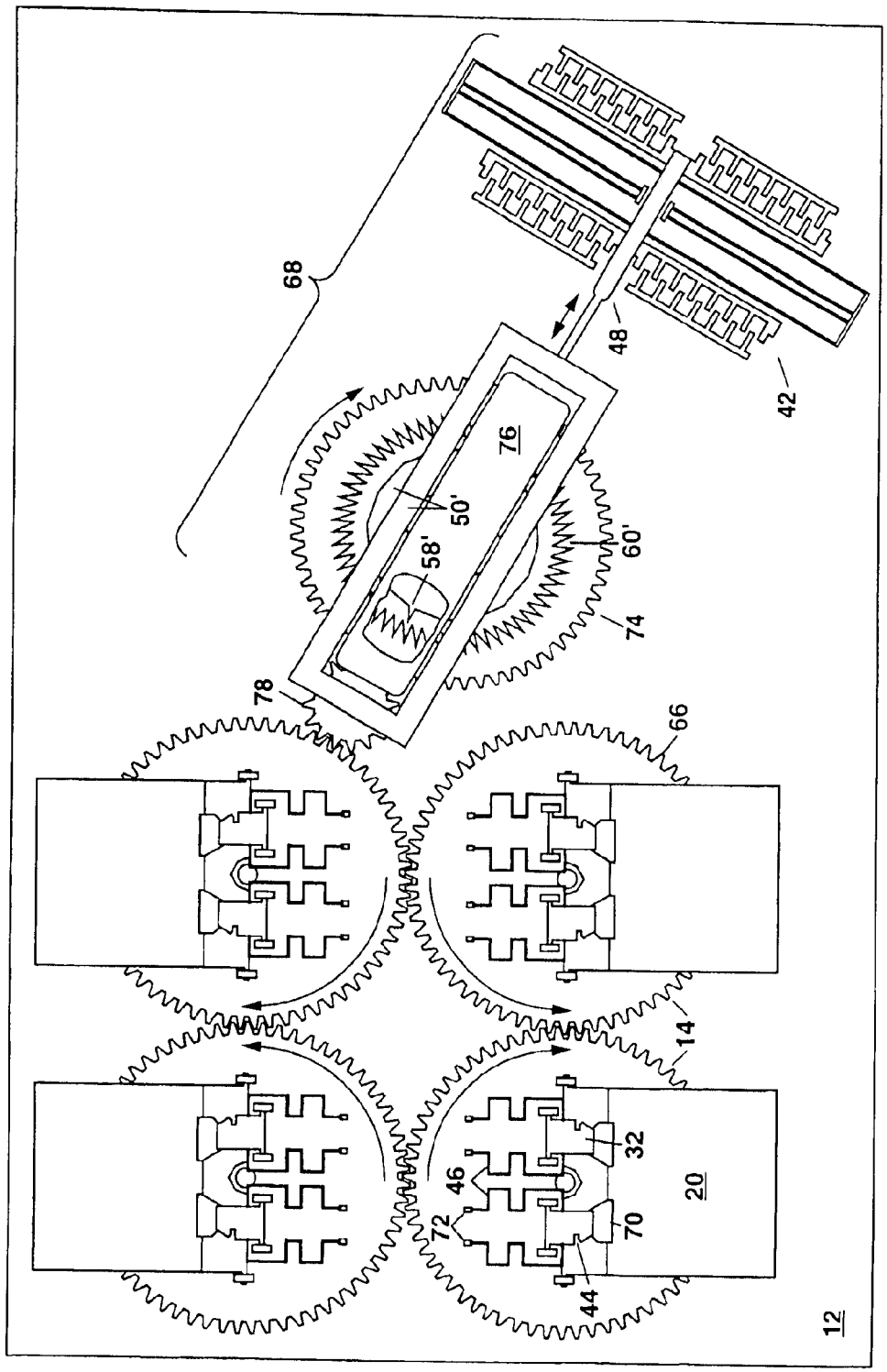
FIG. 5 shows a schematic plan view of another example of the MEM optical switching apparatus of the present invention in an as-fabricated state with each mirror in the initial position substantially parallel to the plane of the substrate.
Figure 6:
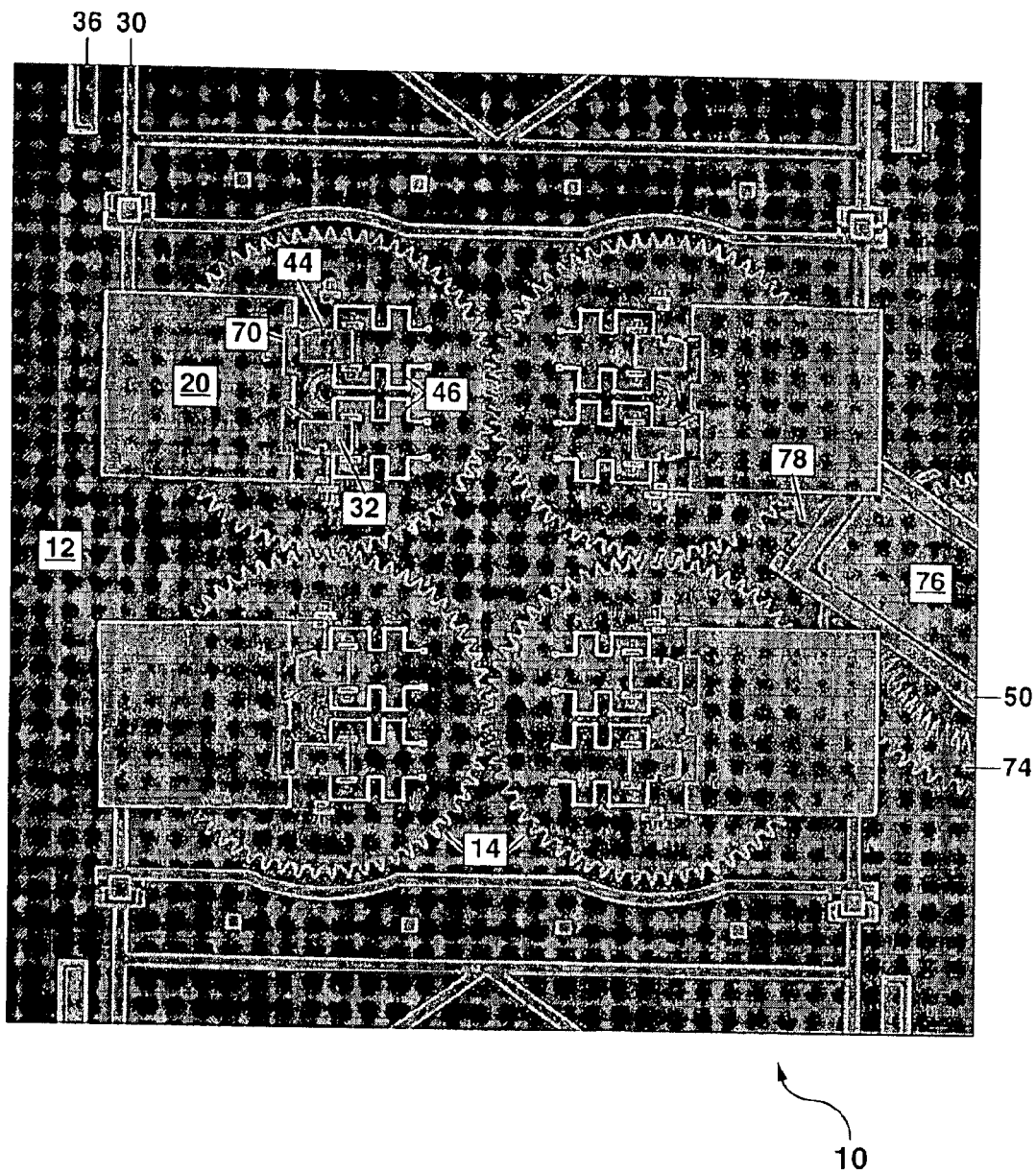
FIG. 6 shows an SEM image of the MEM optical switching apparatus of FIG. 5 with each mirror being rotated by ±90° from its as-fabricated state.

An example of such a MEM optical switching apparatus 10 that is driven through gear teeth formed on the periphery of the stage 14 is shown in FIG. 5 which schematically illustrates the apparatus 10 in plan view in an as-fabricated state with the mirrors 20 being in their initial position substantially parallel to the major surface of the substrate 12. In FIG. 5, the hinged frames 30 used to erect the mirrors 20 in pairs are omitted for clarity, although these frames 30 can be seen in an SEM image of a fabricated device 10 in FIG. 6. In the image of FIG. 6, each mirror 20 has been rotated by ±90° from its as-fabricated position.

In the example of FIGS. 5 and 6, a plurality of stages 14 with external gear teeth 66 are formed on a common substrate 12 and are mechanically interconnected so that when one stage 14 is driven to rotate, each adjacent stage 14 will be driven to rotate in an opposite direction as shown by the curved arrows. In other embodiments of the present invention, an idler gear (not shown) can be formed on the substrate 12 between each adjacent pair of stages 14 so that all the stages 14 will rotate in the same direction. By interconnecting the various stages 14 together through the external gear teeth 66 only a single micromotor 68 is needed to operate the apparatus 10 and to rotate the various mirrors 20.

The MEM optical switching apparatus 10 in FIG. 5 also shows that different orientations for the latches 32 are possible. In this example of the present invention, a pair of cutouts 70 are formed in each mirror 20 to engage with the latches 32 for that mirror 20. As each mirror 20 is erected using a frame 30 as described previously with reference to FIGS. 2A–2C, the latches 32 slide over a sloped edge of the cutouts 70 and then snap into place to lock the mirror at a predetermined angle with respect to the plane of the substrate 12. A pair of latch springs 46 attached on either side of each latch 32 and also attached to the substrate 12 through posts 72 help to snap the latches 32 in place and to keep them there.

In the example of FIGS. 5 and 6, the micromotor 68 (also termed a wedge-stepping motor) comprises an electrostatic actuator 42 which is operably connected to reciprocate a shuttle 50' which includes a pair of oppositely-directed teeth 58' that can be moved to push against opposing teeth 60' formed about an inner diameter of a ring gear 74. A guide 76 attached to the substrate 12 at each end thereof can be used to hold the shuttle 50' and ring gear 74 on the substrate 12 and to precisely guide the motion of the teeth 58' and 60' for proper meshing thereof. The reciprocating motion of the shuttle 50' provided by an electrostatic comb actuator 42 rotates the ring gear 74 incrementally in the clockwise direction with each backward and forward stroke of the shuttle 50'. The ring gear 74 can then drive one of the stages 14 directly to rotate each of the mirrors 20. An idler gear 78 can optionally be provided between the ring gear 74 and a driven stage 14 as shown in the example of FIGS. 5 and 6.

After fabrication of the MEM optical switching apparatus 10, each mirror 20 can be erected using the hinged frame 30 as described previously with reference to FIGS. 2A–2C and locked in place using the latches 32. The mirrors 20 can be erected in pairs by providing a frame 30 which spans a pair of the mirrors 20 as shown in FIG. 6. Once erected, the mirrors 20 can be oriented substantially perpendicular to the substrate 12 or at an angle thereto depending upon the exact location of the slot 44 formed in each latch 32.

The MEM optical switching apparatus 10 can then be packaged and electrical connections can be made to the electrostatic actuator 42 through wiring (not shown) on the substrate 12. Various modes of operation of the MEM optical switching apparatus 10 are possible. These modes of operation are described by way of example with reference to FIGS. 7–9 and are not intended to be exclusive. Those skilled in the art will understand that other modes of operation are possible which can be learned by practice of the present invention.

Figure 7:
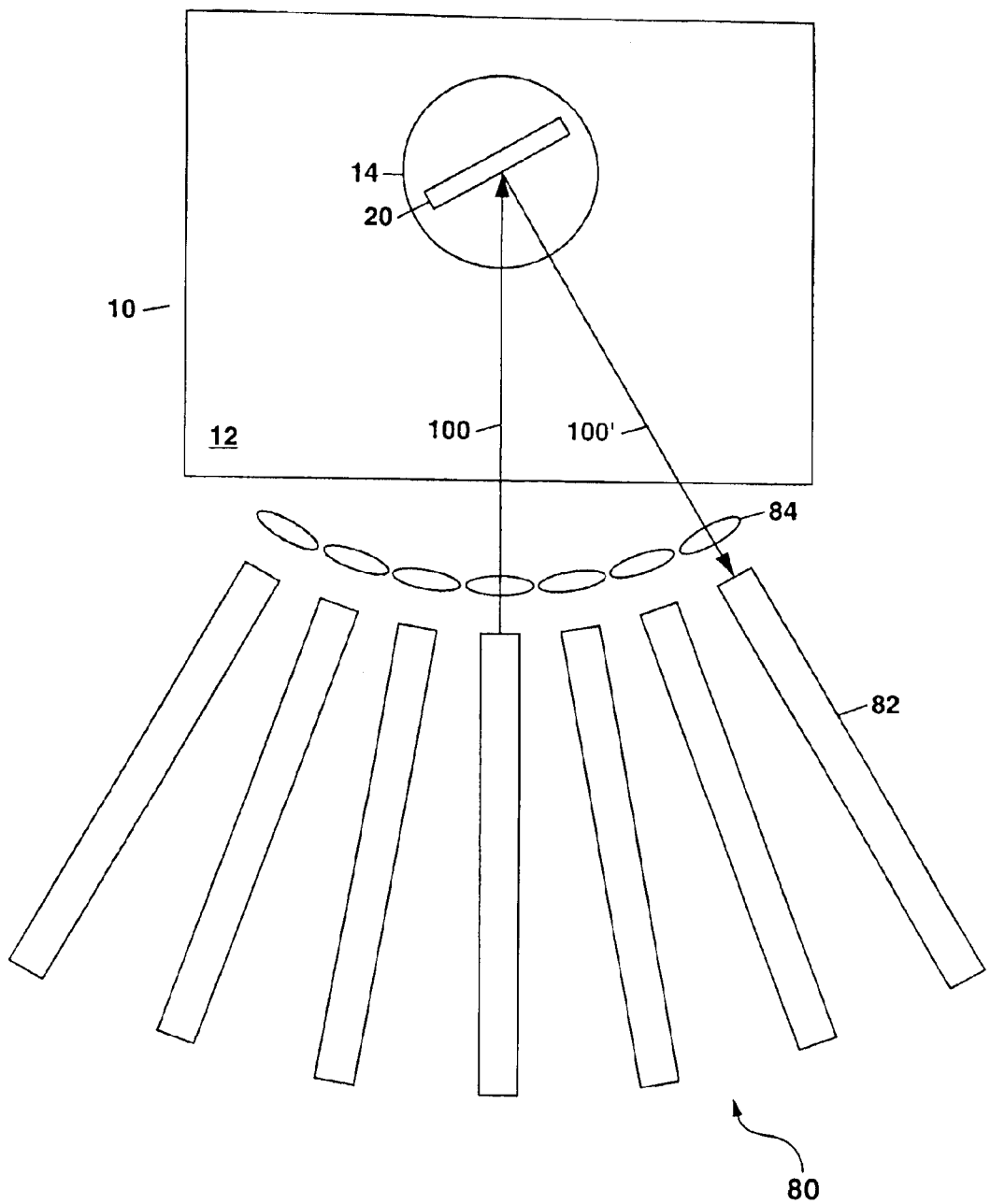
FIG. 7 shows an example of a 1×N optical switch formed from the MEM optical switching apparatus of FIGS. 1–4.

In FIG. 7, an example of a 1×N optical switch 80 is schematically illustrated in plan view using the MEM optical switching apparatus 10 of FIGS. 1–4. The 1×N optical switch 80 can comprise a plurality N+1 of optical fibers 82 arranged at predetermined angles with respect to the MEM optical switching apparatus 10 including a source fiber wherefrom the incident light beam 100 emanates and N optical fibers to which the incident light beam 100 can be redirected. The light beam 100 from the source fibers, which can be any one of the optical fibers 82 shown in FIG. 7, can be directed substantially parallel to the plane of the substrate 12 to impinge on a light-reflecting surface of the erected mirror 20. A lens 84 can be used to collimate or focus the incident light beam 100 as needed. The incident light beam 100 is reflected from the mirror 20 to produce a redirected light beam 100' at a particular angle which is determined by rotation of the stage 14 and mirror 20 thereon. The redirected light beam 100' can thus be switched to any of the other N optical fibers 82 simply by rotating the stage 14 in the apparatus 10 to an appropriate angle. The removal of all electrical power from the apparatus 10 will leave an optical interconnection between a pair of the optical fibers 82 in place indefinitely, so that the electrical power need be applied to the MEM optical switching apparatus 10 only when a new optical interconnection between a different pair of the optical fibers 82 is to be established.

Figure 8A:
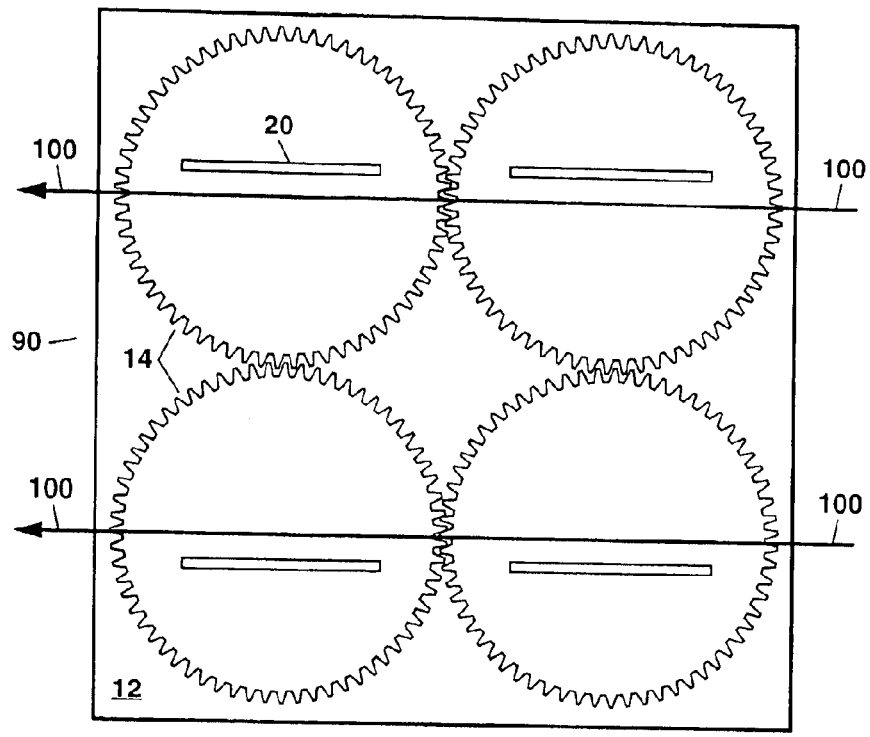
FIGS. 8A and 8B show two different switching states of a 2×2 optical switch formed from the MEM optical switching apparatus of FIGS. 5 and 6.
Figure 8B:
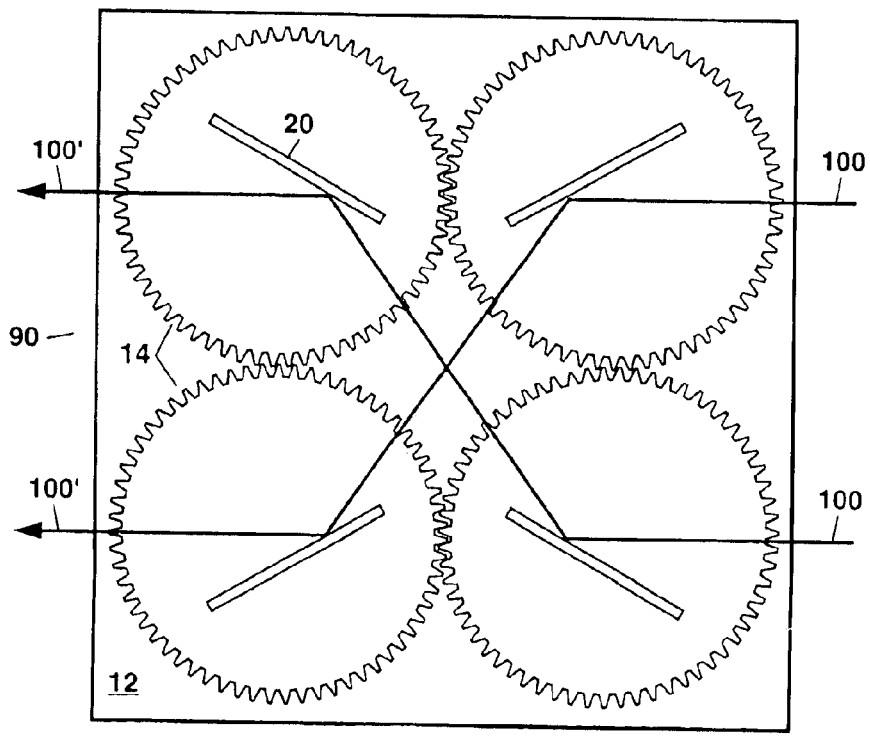

In FIGS. 8A and 8B, an example of a 2×2 optical switch 90 formed using the apparatus 10 of FIGS. 5 and 6 is schematically illustrated in a simplified plan view. In FIG. 8A, the mirrors 20 on each stage 14 have been located at a distance from the center of rotation of the stage 14 so that a pair of incident light beams 100 can be transmitted substantially parallel to the plane of the substrate 12 and over the stages 14 without being intercepted by the mirrors 20 when the mirrors 20 are oriented substantially parallel to the incident light beams 100. In FIG. 8B, by rotating the stages 14 as shown, each incident light beam 100 can be intercepted by a pair of the mirrors 20 and redirected in space to form redirected light beams 100'. The light beams 100 and 100' can be propagated in free space or can come from one pair of optical fibers and be redirected back into another pair of optical fibers.

Figures 9A, 9B:
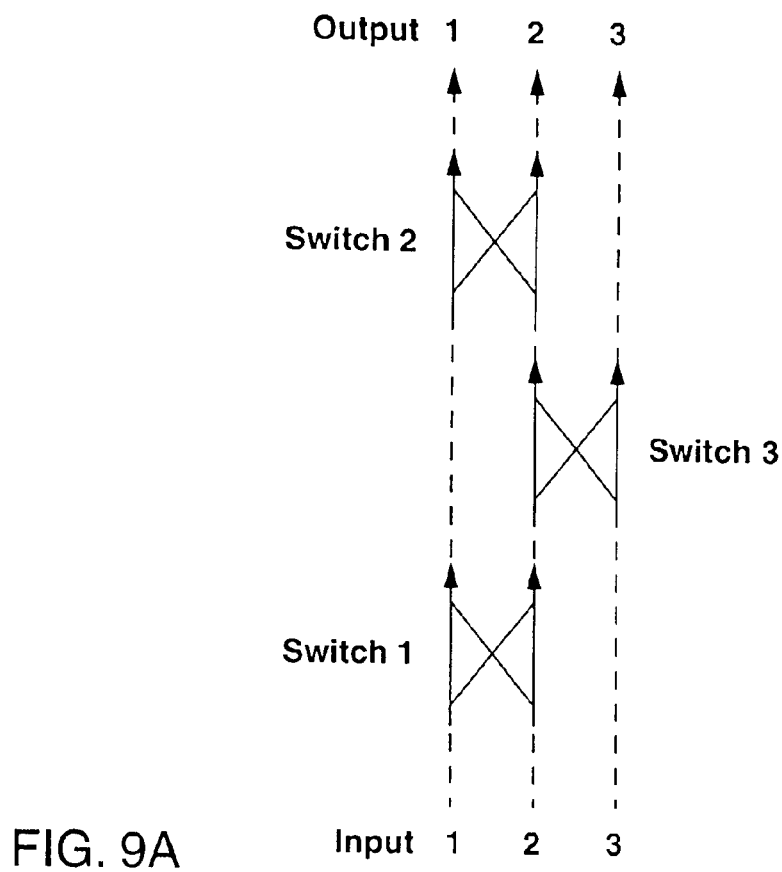
FIG. 9A shows an example of a 3×3 optical switch formed by ganging three 2×2 optical switches formed according to FIGS. 5 and 6.
FIG. 9B shows a truth table for operation of the 3×3 optical switch of FIG. 9A.

A plurality of 2×2 optical switches as shown in FIGS. 8A and 8B can be combined to form a higher-order N×N optical switch. This is schematically illustrated in FIG. 9A where three switches 2×2 optical switches 90 have been ganged together to form a 3×3 optical switch, with each channel of the 3×3 optical switch being indicated by a vertical dashed line, and with each 2×2 optical switch 90 either transmitting a pair of incident light beams 100 unchanged as shown in FIG. 8A (indicated by a "0" state in a truth table shown in FIG. 9B), or switched as shown in FIG. 8B (indicated by a "1" state in the truth table in FIG. 9B). The truth table of FIG. 9B shows that any of six possible switching arrangements are possible for the three channels in the 3×3 optical switch. Additionally, there is some redundancy in output signal ordering in FIG. 9B which can be advantageous to provide an enhanced reliability for the 3×3 optical switch.

Those skilled in the art will understand that higher-order N×N optical switches can be formed by ganging additional 2×2 optical switches 90 using the methodology set forth herein with reference to FIGS. 9A and 9B. Those skilled in the art will also understand that different topologies for optical switches can be used based on the teachings herein.

The MEM optical switching apparatus 10 of the present invention can be formed by conventional surface micromachining wherein a plurality of layers of polycrystalline silicon (also termed polysilicon) and a sacrificial material are alternately deposited on the substrate 12 and patterned. This is schematically illustrated in the cross-section views of 10A–10L which are taken along the section line 1—1 in FIG. 1 to illustrate fabrication of the apparatus 10 of FIGS. 1–4. Fabrication of the apparatus 10 of FIGS. 5–6 can also proceed in the same manner using surface micromachining.

Surface micromachining utilizes a series of well-known semiconductor integrated circuit (IC) processing steps, including material deposition, photolithography, masking, etching, mask stripping, and cleaning. A relatively large number of individual process steps can be used to form the completed structure of the MEM optical switching apparatus 10 based on repeated deposition and patterning of alternating layers of polycrystalline silicon (also termed polysilicon) and a sacrificial material (e.g. silicon dioxide or a silicate glass), with the MEM optical switching apparatus 10 in the as-fabricated state being built up layer by layer. Altogether, five layers of polysilicon can be used to fabricate the MEM optical switching apparatus 10 of the present invention.

The term "patterning" as used herein refers to a sequence of well-known processing steps including applying a photoresist to the substrate 12, prebaking the photoresist, aligning the substrate 12 with a photomask, exposing the photoresist through the photomask, developing the photoresist, baking the wafer, etching away the surfaces not protected by the photoresist, and stripping the protected areas of the photoresist so that further processing can take place. The term "patterning" can further include the formation of a hard mask (e.g. comprising about 500 nanometers of a silicate glass deposited from the decomposition of tetraethylortho silicate, also termed TEOS, by low-pressure chemical vapor deposition at about 750° C. and densified by a high temperature processing) overlying a polysilicon or sacrificial material layer in preparation for defining features into the layer by etching.

Figure 10A:
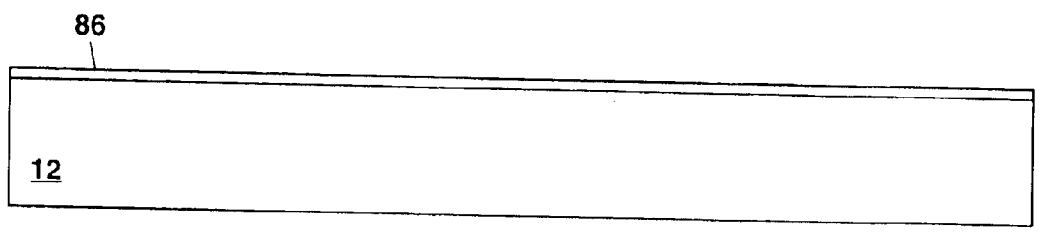
FIGS. 10A–10L show schematic cross-section views along the section 1—1 in FIG. 1 to illustrate fabrication of the MEM optical switching apparatus of FIGS. 1–4 by surface micromachining.

In FIG. 10A, a substrate 12 is provided which preferably comprises silicon, and can be either a monocrystalline silicon substrate or a silicon-on-insulator substrate. The substrate 12 can be initially prepared for fabrication of the MEM optical switching apparatus 10 as shown in FIG. 10A by blanketing the substrate with an electrically-insulating layer 86 which comprises a layer of thermal oxide (about 600 nanometers thick) formed by a conventional wet oxidation process at an elevated temperature (e.g. 1050° C. for about 1.5 hours) and an overlying layer of low-stress silicon nitride (e.g. 800 nanometers thick) which can be deposited using low-pressure chemical vapor deposition (LPCVD) at about 850° C. The electrically-insulating layer 86 provides electrical isolation from the substrate 12 for a subsequently-deposited first polysilicon layer (termed Poly-0). One or more vias can be photolithographically defined and etched through the thermal oxide and silicon nitride layers so that electrical connections between the Poly-0 layer and the substrate 12 can be formed as needed (e.g. for ground planes underlying the stage 14, the mirror 20 and the electrostatic comb actuator 42, and for a ground electrical contact pad).

Figure 10B:
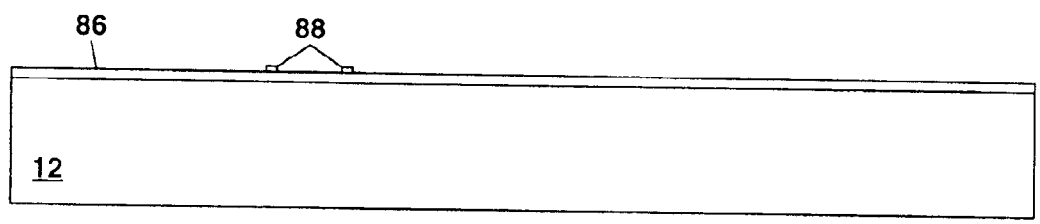

In FIG. 10B, the structure of the MEM optical switching apparatus 10 can be initiated by the deposition of a Poly-0 layer 88. The Poly-0 layer 88, which can be about 0.3 $\mu$m thick, can be deposited by LPCVD at about 580° C. to blanket the substrate 12 and the electrically-insulating layer 86. Phosphorous doping can be used to make the Poly-0 layer 88 and subsequently-deposited polysilicon layers electrically conductive as needed. The Poly-0 layer 88 can then be patterned as shown in FIG. 3B by photolithographic definition and reactive ion etching to begin to build up a hub 92 for the stage 14, the hinges 38 and 38', the guides 36, posts 28, the stationary electrostatic combs 52 and supports for the folded hinges 56 and the anti-rotation pawls 64. The Poly-0 layer 88 can also be used to form the wiring 26 and contact pads 24. After deposition and patterning, the Poly-0 layer 88 can be annealed at a high temperature (e.g. at about 1100° C. for three hours) to reduce any residual stress therein. A separate annealing step can be performed after deposition and patterning of each subsequently-deposited polysilicon layer.

Figure 10C:
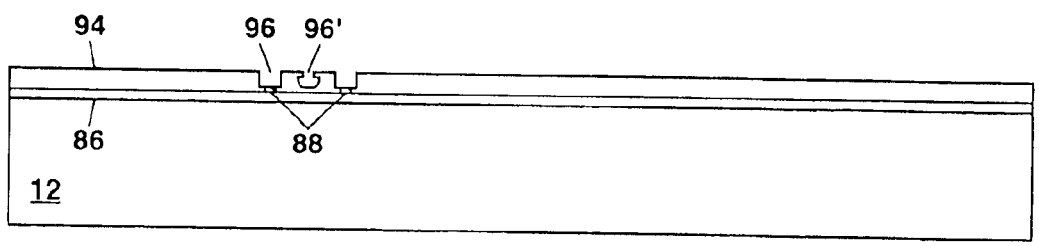

In FIG. 10C, a first layer of a sacrificial material 94 can be blanket deposited to cover the Poly-0 layer 88 and the substrate 12, and then patterned to form a plurality of anisotropically etched openings 96 partially or completely through the sacrificial material 94 at the locations of the hub 92 and other elements of the apparatus 10 being built up from a plurality of stacked and interconnected polysilicon layers. An undercut opening 96' for a lower part of an axle 98 can be formed in the first layer of the sacrificial material 94 using isotropic etching, or using a combination of anisotropic etching followed by isotropic etching. The anisotropic etching can comprise, for example, reactive ion etching; and the isotropic etching comprises etching with an isotropic etchant comprising hydrofluoric acid (HF). The undercut opening 96' can be used to form the axle 98 which will be captured within the hub 92.

Other openings 96 in the first layer of the sacrificial material 94 can be provided to form a plurality of dimples (not shown) underlying moveable elements (e.g. the stage 14 and the hinged frame 30) of the apparatus 10. These dimples are useful to allow the moveable elements to slide over the substrate 12 while preventing stiction (i.e. adhesion of the moveable elements to the substrate 12). The first layer of the sacrificial material 94, which can be, for example, 2 $\mu$m thick, can comprise silicon dioxide ($SiO_2$) or a silicate glass (e.g. a plasma-enhanced CVD oxide, also termed PECVD oxide; or a TEOS silicate glass as described previously).

After deposition, each layer of the sacrificial material 94 described herein can be planarized, as needed, by chemical-mechanical polishing (CMP) as disclosed in U.S. Pat. No. 5,804,084 to Nasby et al, which is incorporated herein by reference. The use of CMP permits the layer thickness of each layer of the sacrificial material 94 to be precisely adjusted, maintains a planar topography during buildup of the structure of the MEM optical switching apparatus 10, and eliminates any stringers which might otherwise occur as a result of anisotropic etching (e.g. reactive ion etching) which is used to define the shapes of the various elements in the MEM optical switching apparatus 10 and to form the openings 96 in the sacrificial material 94.

Figure 10D:
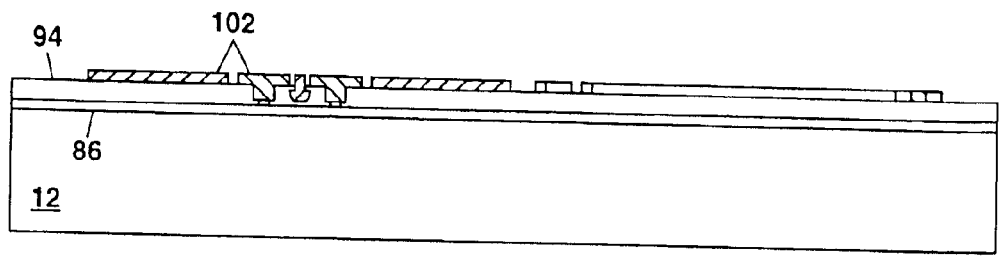

In FIG. 10D, a second layer 102 of polysilicon (termed Poly-1) is deposited over the first layer of the sacrificial material 94 to fill in the openings 96 and 96' and to blanket the substrate 12. The second layer 102 of polysilicon, about 1 $\mu$m thick, is used to further build up the stage 14 including the hub 92 and axle 98 and also to build up the stationary electrostatic combs 52 and to begin to build up other elements of the electrostatic comb actuator 42 including the moveable electrostatic combs 54, the folded springs 58 and the moveable beam 48. The Poly-1 layer 102 is also used to build up the hinges 38 and 38' and a plurality of interconnected beams of the hinged frame 30 and also the guides 36, posts 28, and supports for the folded hinges 56 and anti-rotation pawls 64.

Figure 10E:
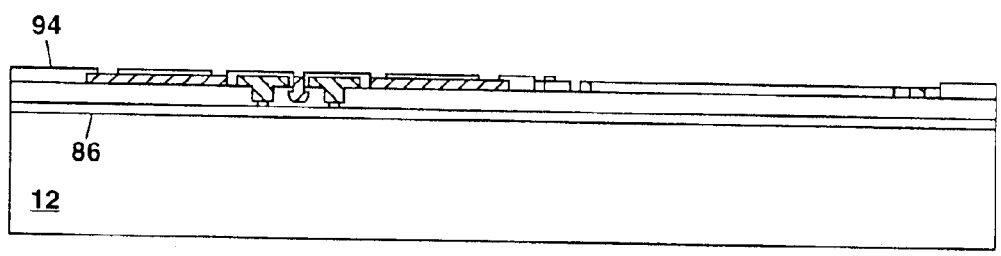

In FIG. 10E, another layer of the sacrificial material 94 can be blanket deposited over the substrate 12 and planarized by CMP. This layer of the sacrificial material 94 can be 2 $\mu$m thick and can be patterned after the CMP step to form additional openings 96 in preparation for the deposition of a subsequent layer 104 of polysilicon (denoted as the Poly-2 layer).

Figure 10F:
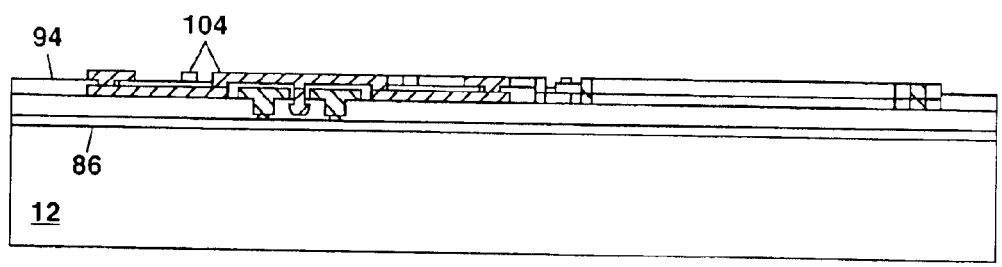

In FIG. 10F, the Poly-2 layer 104 can deposited over the substrate 12 and to fill in the openings 96 in the sacrificial material 94 and to blanket the substrate 12. The Poly-2 layer 104 can then be patterned to further build up portions of the stage 14 including the hub 92, axle 98 and teeth 60. The Poly-2 layer 104 is also used to build up a lower portion of the shuttle 50 and the teeth 58 therein, to further build up the structure for the hinged frame 30 including the hinges 38 and 38' and support posts 28 for the fuzes 22, to form a filament of the fuzes 22 which connects the mirror 20 to the support posts 28, and to form a tooth for the pawl 64 that is in contact with the teeth 60 on the stage 14. Finally, the Poly-2 layer 104 is used to further build up elements of the electrostatic comb actuator 42 including the stationary and moveable electrostatic combs 52 and 54, the folded hinges 56 and the moveable beam 48. The Poly-2 layer 104 can be, for example, 2.25 $\mu$m thick.

Figure 10G:
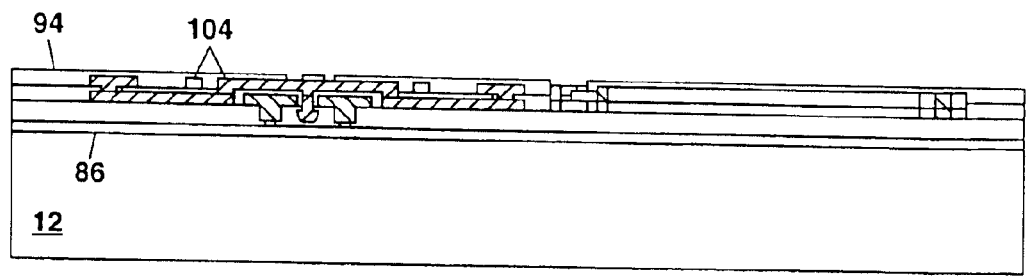

In FIG. 10G, yet another layer of the sacrificial material 94 is blanket deposited over the substrate 12 and planarized by CMP. This layer of the sacrificial material 94 can be 2 $\mu$m thick and is patterned so that a subsequent Poly-3 layer 106 can be blanket deposited over this layer of the sacrificial material 94 to further build up elements of the apparatus 10.

Figure 10H:
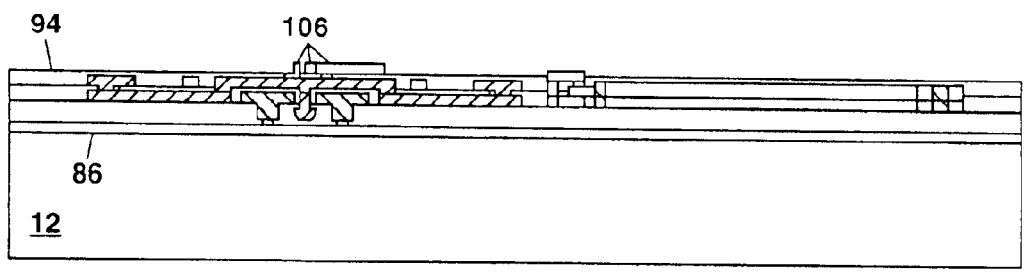

In FIG. 10H, the Poly-3 layer 106 comprising polysilicon can be blanket deposited over the substrate 12 and patterned to begin to form a portion of the mirror 20 and hinges 40 therefor for hingeably attaching the mirror 20 to the stage 14. The Poly-3 layer 106 is also used to form a bridge for the pawl 64 over top the stage 14 and a support for the pawl 64 built up from the substrate 12. The Poly-3 layer 106 is further used to form an upper portion of the shuttle 50 over top the stage 14 to connect the shuttle 50 to the moveable beam 48 of the electrostatic comb actuator 42, with the upper portion of the shuttle 50 being formed about and slideably captured by a pair of guides 62 built up from the Poly-0 through Poly-3 layers and an overlying Poly-4 layer 108 to be formed subsequently. The guides 62 can be attached to the substrate 12 by an underlying support built up from the Poly-0 through Poly-2 layers outside the stage 14. Additionally, the Poly-3 layer can be used to further build up the structure of the electrostatic comb actuator 42 including the stationary and moveable electrostatic combs 52 and 54. The Poly-3 layer 106 can be, for example, 2.25 $\mu$m thick.

Figure 4:
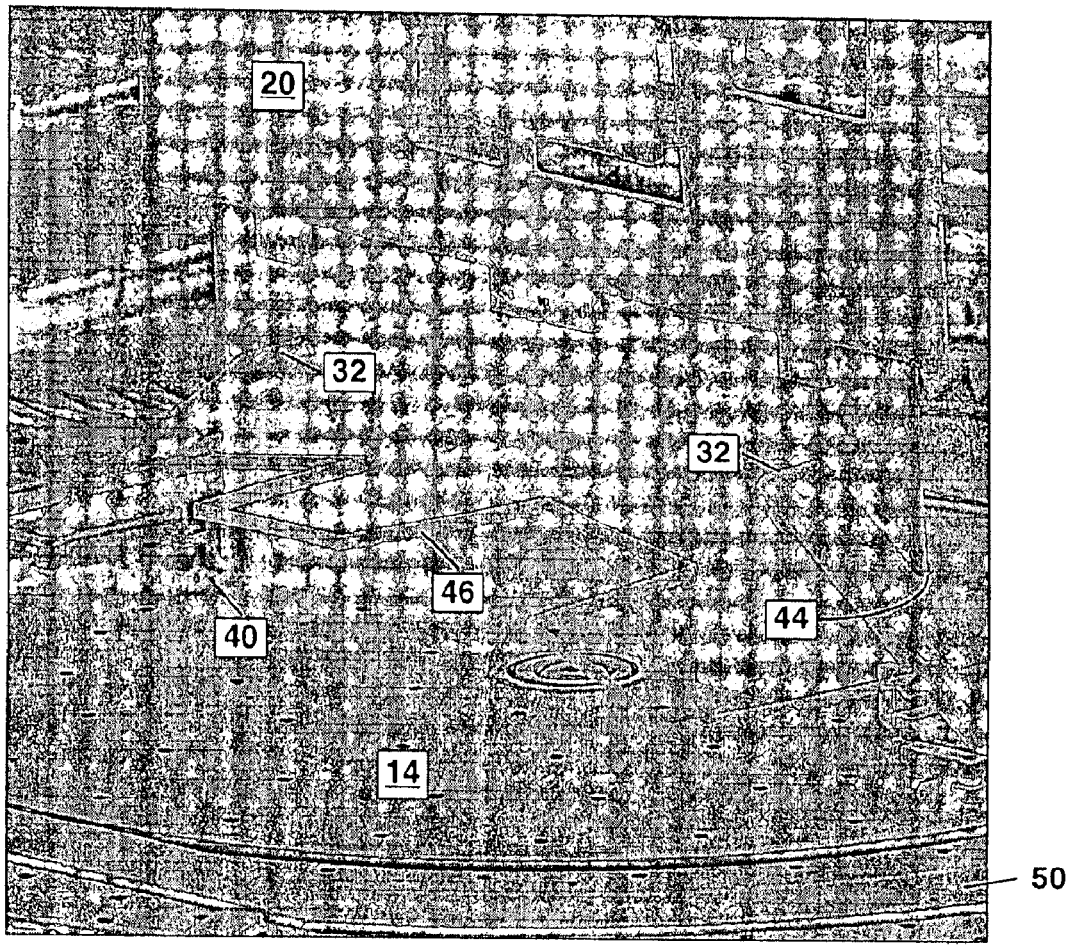
FIG. 4 shows an enlarged view of a portion of the SEM image of FIG. 3 to show details of a pair of latches and a latch spring which lock the erected mirror in position.
Figure 10I:
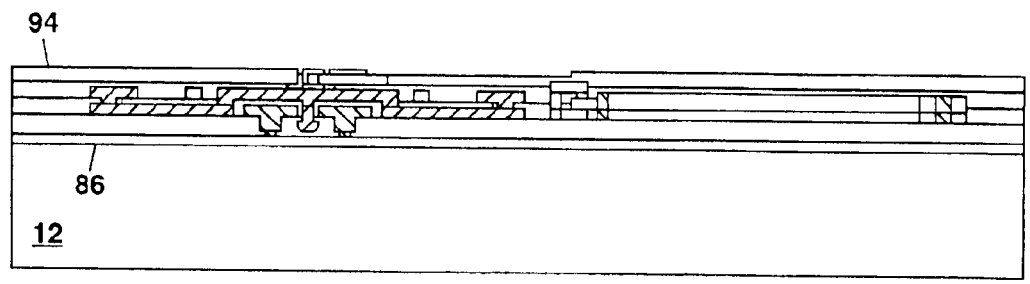
Figure 10J:
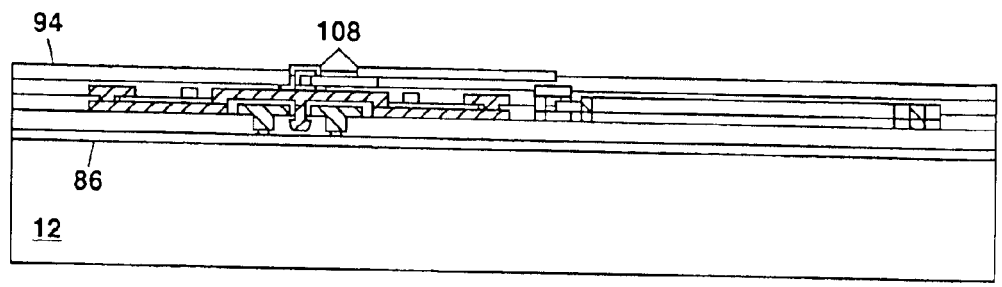

In FIG. 10I, another layer of the sacrificial material 94 about 2 $\mu$m thick is blanket deposited over the substrate and planarized by CMP. This layer of the sacrificial material 94 can then be patterned in preparation for the deposition of an overlying Poly-4 layer 108 which is used to further build up the mirror 20 and the hinges therefor as shown in FIG. 10J. The Poly-4 layer 108, which can be 2.25 $\mu$m thick, is also used to form the latches 32 and the latch spring 46, and can be optionally used to further build up the electrostatic comb actuator 42 (i.e. to provide a larger surface area for the stationary and moveable electrostatic combs 52 and 54). Hinges for each latch 32 and the mirror 20 can be formed from the Poly-3 and Poly-4 layers as shown in FIG. 4.

Figure 10K:
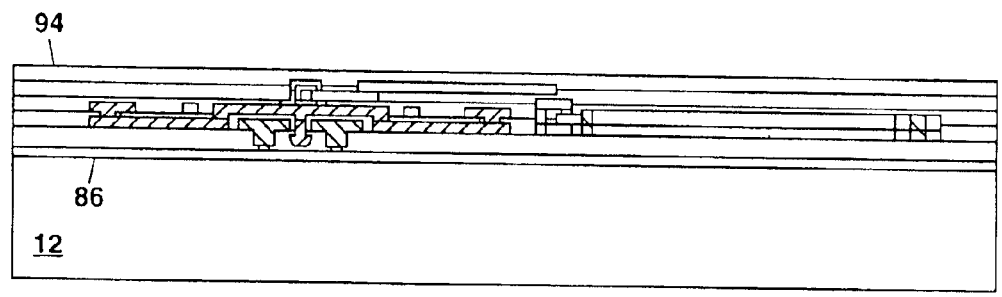

In FIG. 10K, a final layer of the sacrificial material 94 can be blanket deposited over the substrate 12 to encapsulate the Poly-4 layer 108 in preparation for a final high-temperature annealing step (e.g. at 1100° C. for three hours) to minimize any residual stress in the various polysilicon layers. This layer of sacrificial material 94, which can be, for example, 2 $\mu$m thick, does not need to be planarized by CMP.

After the final annealing step, the MEM optical switching apparatus 10 can be released for operation by selectively etching away the various layers of the sacrificial material 94. This is done using a selective wet etchant comprising HF that does not chemically attack the polysilicon and silicon nitride layers. This etching step can be performed over a period of several hours or overnight. A plurality of micron-sized openings can be formed through the stage 14 and mirror 20 and other large elements of the apparatus 10 as shown in FIGS. 3 and 4 to assist in the removal of the various layers of the sacrificial material 94.

Figure 10L:
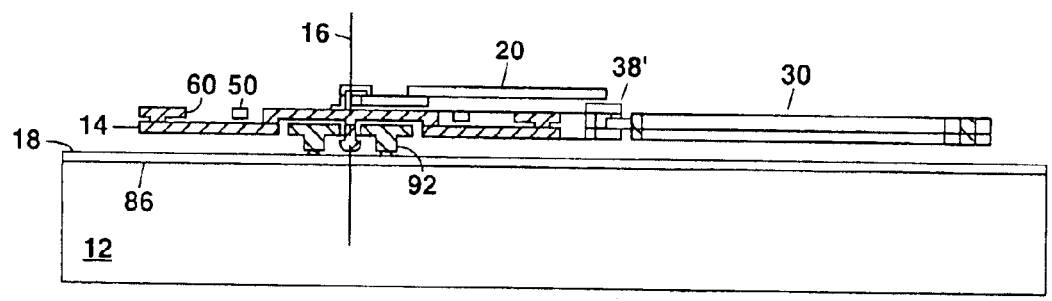

The completed MEM optical switching apparatus 10 after removal of the sacrificial layers is shown in FIG. 10L and also in FIGS. 1 and 2A. Although not shown, the various contact pads 24, the ground contact pad and additional contact pads for the electrostatic actuator 42 can be metallized using a deposited layer of a contact pad metal such as tungsten or aluminum or an alloy thereof (e.g. an AlCu alloy). This can be done, for example, prior to releasing the MEM optical switching apparatus 10 by anisotropically etching (e.g. using reactive ion etching) down through the various layers of the sacrificial material 94 at the locations of the various contact pads and then depositing the contact pad metal over the Poly-0 layer 88.

An optional reflective metal coating (e.g. comprising a layer of gold or aluminum or an aluminum alloy about 100–200 nanometers thick) can also be deposited over the light-reflecting surface of the mirror 20 to provide an enhanced reflectivity. This can be done, for example, by evaporating or sputtering the metal coating using a shadow mask after releasing the MEM optical switching apparatus 10 and prior to erecting the mirror 20. A thin layer of titanium can be provided on the mirror 20 prior to depositing a gold metal layer to improve the adhesion thereof.

The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A microelectromechanical optical switching apparatus for redirecting an incident light beam, comprising:
    (a) a stage formed on a substrate, with the stage being rotatable about an axis which is substantially perpendicular to a major surface of the substrate;
    (b) a mirror formed on the stage in an initial position which is substantially parallel to the major surface of the substrate, with the mirror being subsequently moveable to an erected position which is oriented substantially perpendicular to the major surface of the substrate; and
    (c) an electrostatic actuator operatively coupled to rotate the stage and thereby redirect the incident light beam.

2. The apparatus of claim 1 wherein the substrate comprises silicon.

3. The apparatus of claim 1 further comprising an electrically-severable fuze for attaching the mirror to the substrate in the initial position.

4. The apparatus of claim 1 further comprising a hinged frame for moving the mirror to the erected position.

5. The apparatus of claim 1 wherein the mirror is locked in the erected position by a latch formed on the stage.

6. The apparatus of claim 5 wherein the latch includes a spring to urge the latch into contact with the mirror and thereby lock the mirror in the erected position.

7. The apparatus of claim 1 wherein the stage includes a plurality of teeth formed proximate to an outer edge of the stage.

8. The apparatus of claim 1 wherein the mirror comprises two interconnected layers of polycrystalline silicon.

9. The apparatus of claim 1 wherein the electrostatic actuator is operatively coupled to rotate the stage with a reciprocating shuttle which includes a pair of teeth which engage with a plurality of opposing teeth formed on the stage proximate to an outer edge thereof.

10. The apparatus of claim 1 wherein the electrostatic actuator comprises an electrostatic comb actuator.

11. A microelectromechanical optical switching apparatus for redirecting an incident light beam, comprising:
   (a) a stage formed on a substrate, with the stage being rotatable about an axis which is substantially perpendicular to a major surface of the substrate;
   (b) a mirror formed on the stage in an initial position which is substantially parallel to the major surface of the substrate, with the mirror being subsequently erectable to an erected position with a light-reflecting surface of the mirror being oriented at an angle to the major surface of the substrate;
   (c) a hinged frame formed proximate to mirror to move the mirror from the initial position to the erected position;
   (d) an electrically-severable fuze attaching one end of the mirror to the substrate during fabrication thereof, with the mirror being releasable for movement after the fuze is electrically severed by an electrical current; and
   (e) an electrostatic actuator operatively coupled to rotate the stage and thereby redirect the light beam when the light beam is incident on the light-reflecting surface of the mirror.

12. The apparatus of claim 11 wherein the substrate comprises silicon.

13. The apparatus of claim 11 wherein the mirror is locked in the erected position by a latch formed on the stage.

14. The apparatus of claim 11 wherein the electrostatic actuator comprises an electrostatic comb actuator.

15. The apparatus of claim 14 wherein the electrostatic comb actuator is operatively coupled to rotate the stage with a reciprocating shuttle which includes a pair of teeth which engage with a plurality of opposing teeth formed on the stage proximate to an outer edge thereof.

16. The apparatus of claim 11 wherein the mirror in the erected position is oriented at an angle substantially equal to 90° with respect to the major surface of the substrate.

* * * * *